FREDERICK KEIFEL.
Improvement in Device for Lubricating Loose Pulleys.
No. 124,589. *Fig. 1.* Patented March 12, 1872.
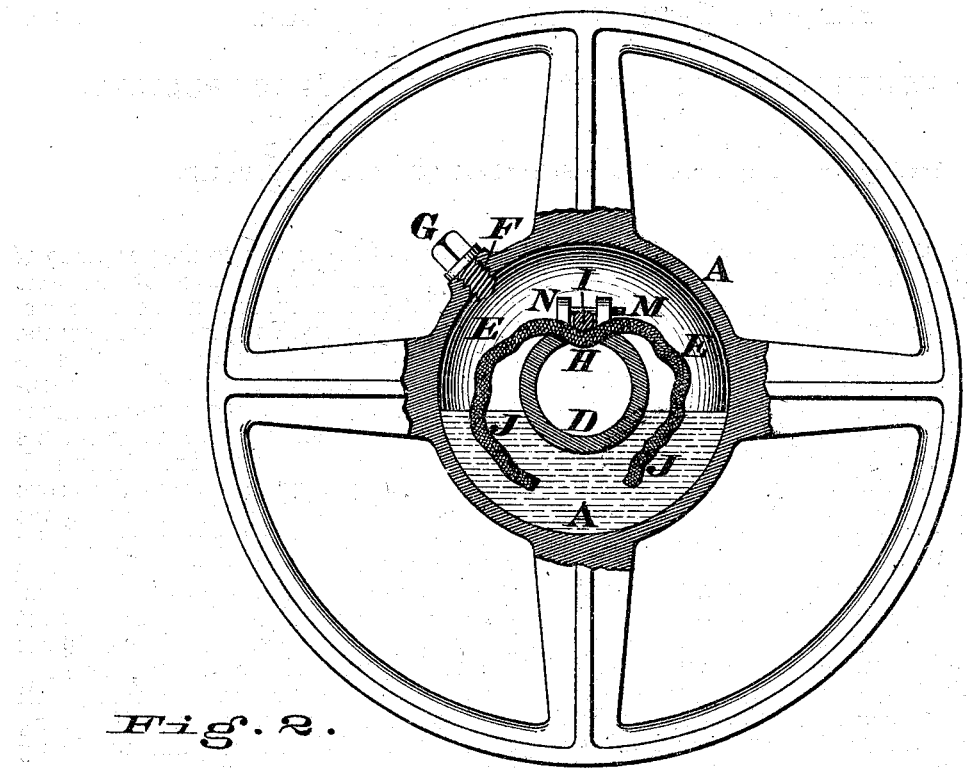
*Fig. 2.*
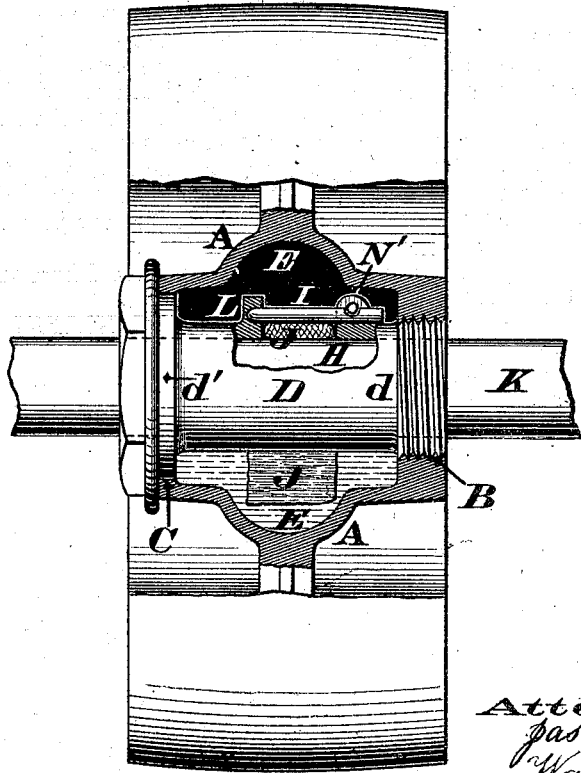
*Fig. 3.*
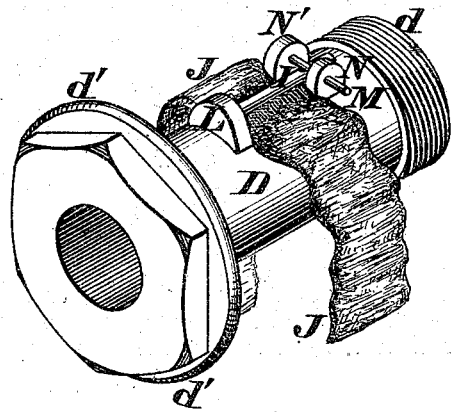
F. Keifel
INVENTOR.
By Knight Bros
attys
Attest.
Jas. H. Layman.
Walter Allen

UNITED STATES PATENT OFFICE.

FREDERICK KEIFEL, OF CINCINNATI, OHIO.

IMPROVEMENT IN DEVICES FOR LUBRICATING LOOSE PULLEYS.

Specification forming part of Letters Patent No. 124,589, dated March 12, 1872.

I, FREDERICK KEIFEL, of Cincinnati, Hamilton county, Ohio, have invented a new and useful Device for Lubricating Loose Pulleys, &c., of which the following is a specification:

My invention relates to a simple and effective device for maintaining a supply of oil or other lubricant at the journal-bearing of a loose pulley or other rotary object.

Figure 1 is a side elevation of a loose pulley embodying my invention, the hub being shown in section. Fig. 2 is an axial section of the same. Fig. 3 is a perspective view of the sleeve detached.

The pulley-hub A is made hollow, as shown, and has at its respective ends and concentric with its axis two unequal apertures, B C, of which the smaller aperture, B, is screw-threaded to receive the correspondingly screw-threaded portion $d$ of a sleeve or box, D, (fitting the shaft,) whose opposite extremity has a head or collar, $d'$, which, on the said sleeve being screwed home, bears snugly against the end of the hub, and forms therewith a tightly-inclosed annular space or chamber, E, for the reception and retention of oil or other lubricant introduced through a feed-hole, F, that, when the said chamber or oil-reservoir E is charged, is closed by means of a screw-plug, G. The sleeve-head $d'$ has externally a "six-sided" or other non-circular form for the convenient application of a wrench or spanner for the more easy screwing and unscrewing of the said sleeve from the hub. The said sleeve D has a longitudinal slot, H, outside of and parallel with which is secured a pin, I. A piece of common flat lamp-wick, J, being drawn between the pin and the sleeve, so as to pass or bend into the slot in the manner shown, conveys oil from the reservoir to the periphery of the shaft or axle K, and serves at the same time as a cut-off to prevent such excessive passage of the lubricant as would overflow the bearing—so as to become wasted and scattered. The pin I may be secured in any manner that will fulfill the above requisitions; but I have found effective and recommend the mode represented, and which is as follows: L is a lug projecting transversely from the sleeve at one end of the slot H, and into this lug one end of the pin I is firmly secured, either by being screwed, cast, or riveted therein. The other end of the pin I is held down by a cross-pin, M, which enters lugs N N' that project longitudinally from the sleeve. The chamber E may be supplied with lubricant without disturbing the pulley, and a single charge will last many weeks, the lubricant only flowing when the pulley is in motion, and not being scattered or wasted.

I claim as new and of my invention—

1. The described arrangement of chambered hub A B C, having plugged aperture F G, and having secured axially within it a sleeve, D $d$ $d'$, having the slot H and pin I to hold a lubricating wick, in the manner set forth.

2. In the described combination with the elements of the preceding clause, I claim the lugs L N N' and cross-pin M, for the purpose designated.

In testimony of which invention I hereunto set my hand.

FREDERICK KEIFEL.

Witnesses:
GEO. H. KNIGHT,
JAMES H. LAYMAN.